United States Patent [19]

Fabbri

[11] Patent Number: 5,017,074
[45] Date of Patent: May 21, 1991

[54] BAR LOADER FOR A MULTI-CHUCK MACHINE

[75] Inventor: Vladimiro Fabbri, Faenza, Italy

[73] Assignee: I.E.M.C.A. Spa Industria Elettromeccanica Complessi Automatici, Faenza, Italy

[21] Appl. No.: 252,482

[22] Filed: Sep. 30, 1988

[30] Foreign Application Priority Data

Oct. 14, 1987 [IT] Italy ................ 3651 A/87

[51] Int. Cl.$^5$ ............................................. B65H 3/00
[52] U.S. Cl. .................... 414/224; 414/746.1; 414/746.7; 198/453
[58] Field of Search .......... 414/224, 225, 745.1, 414/745.7, 745.9, 746.1, 746.4, 746.7; 198/443, 453, 836

[56] References Cited

U.S. PATENT DOCUMENTS

| | | | |
|---|---|---|---|
| 1,853,383 | 4/1932 | Sneed | 198/443 |
| 2,804,737 | 9/1957 | Rogier et al. | 198/443 X |
| 2,922,533 | 1/1960 | LaBarge | 414/746.7 |
| 3,305,128 | 2/1967 | Dearsley | 198/443 X |
| 3,394,822 | 7/1968 | Bethke | 414/746.7 X |
| 3,648,823 | 3/1972 | Neer | 198/836 X |
| 3,978,971 | 9/1976 | Conrow et al. | 198/836 X |
| 4,535,662 | 8/1985 | Lynn | 414/746.7 X |
| 4,639,180 | 1/1987 | Cucchi et al. | 414/224 |

FOREIGN PATENT DOCUMENTS

| | | | |
|---|---|---|---|
| 0978134 | 11/1975 | Canada | 414/746.7 |
| 0135034 | 8/1983 | Japan | 414/745.9 |
| 0223621 | 12/1984 | Japan | 414/745.7 |
| 0667892 | 3/1952 | United Kingdom | 414/746.7 |

*Primary Examiner*—David A. Bucci
*Assistant Examiner*—John Vanden Bosche
*Attorney, Agent, or Firm*—Guido Modiano; Albert Josif

[57] ABSTRACT

Bar loader for a multi-chuck machine including a star-shaped structure for supporting a plurality of bar guides, equal in number to the chucks of the machine and openable to receive a bar at a loading position arranged laterally to the structure. One the side of the structure opposite to the one for loading the guides there is a bundle-like magazine which is capable of delivering a group of bars which, by an elevator, are deposited on a sorter which extends transversely below the structure. At the exit from the sorter, a second elevator lifts each individual bar to the loading position where a pusher transfers it to a respective guide.

14 Claims, 6 Drawing Sheets

BAR LOADER FOR A MULTI-CHUCK MACHINE

BACKGROUND OF THE INVENTION

The present invention relates to a bar loader for a multi-chuck machine.

The technical aim of the present invention is to provide a bar loader, for multi-chuck machines, having a compact structure and capable of ensuring perfect operation even for bars having different diameters.

SUMMARY OF THE INVENTION

This aim is achieved by a bar loader for a multi-chuck machine, characterized in that it comprises: a star-shaped structure for supporting a plurality of guides for bars, said guides being equal in number to the chucks of the machine, said guides being openable to receive the bar to be machined at a loading position arranged laterally to said structure, a bundle magazine arranged laterally to said structure on the side opposite to the side of said loading position and capable of feeding a preset number of bars; a bar sorter including a horizontal conveyor which extends below said star-shaped structure, perpendicular to said guides, and a plurality of sprung strips arranged above said conveyor and defining therewith a passage corresponding in height to the gauge of the bars; a first elevator for transferring the bars from the exit of the exit of the magazine onto the conveyor and a second elevator for lifting the individual bars from the conveyor to said guide reception position; means for inserting the individual bars in the respective guides being finally provided.

BRIEF DESCRIPTION OF THE DRAWINGS

Further characteristics and advantages of the invention will become apparent from the detailed description of a preferred embodiment, illustrated only by way of non-limitative example in the accompanying drawings, wherein.

DESCRIPTION OF THE PREFERRED EMBODIMENT

Figure 1:
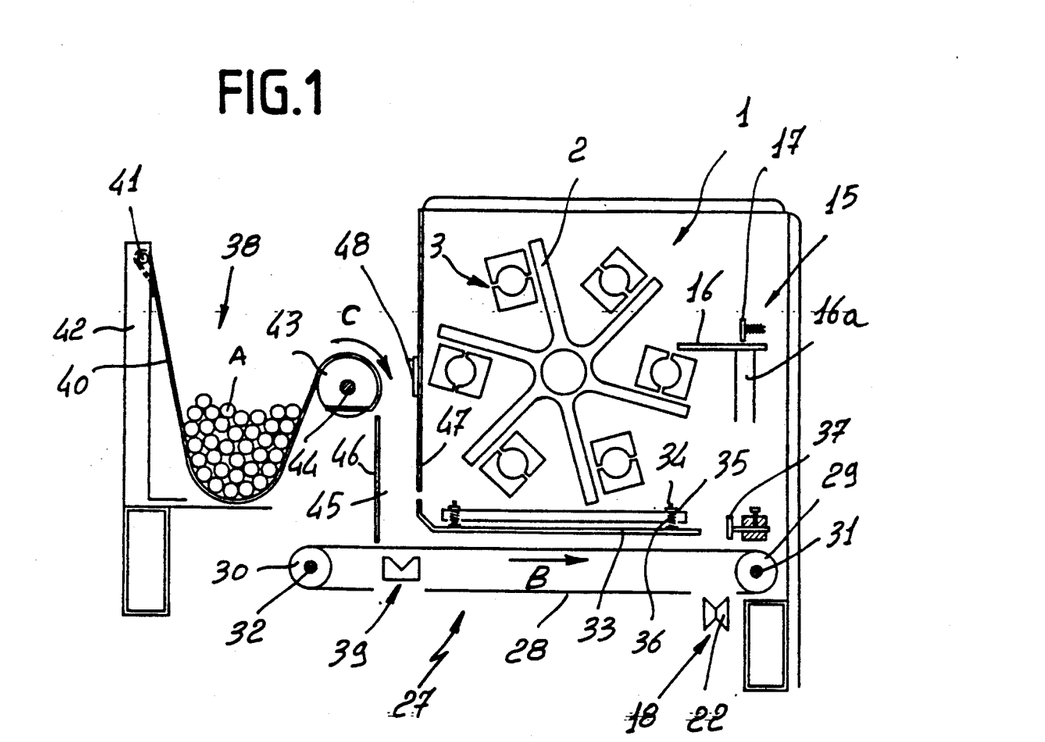
FIGS. 1-7 are partial schematic front views of a loader in successive operating steps.

With reference to the above described figures, in particular to FIG. 1, the loader according to the invention comprises a structure 1 composed of two coaxial stars having arms 2 supporting respective guides 3 for the bars.

The guides 3 are arranged concentrically to the axis of rotation of the structure and aligned with the chucks of the machine within which the bars A must be inserted for machining.

Figure 11:
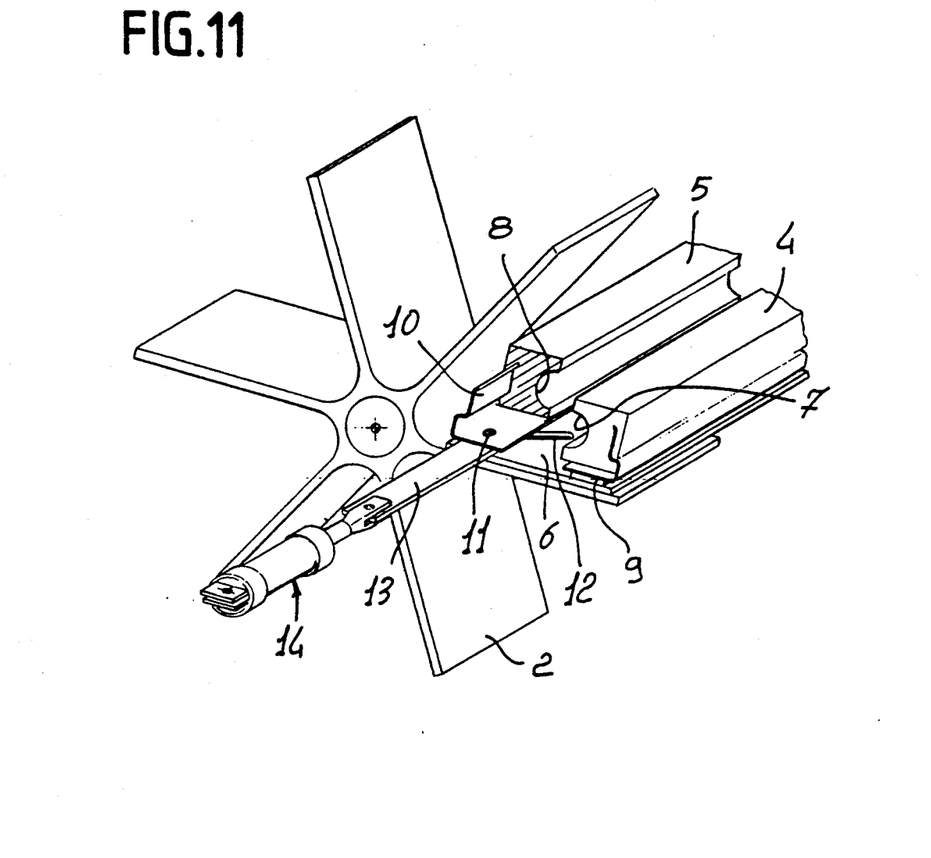
FIG. 11 is a perspective view of the means for the opening and the closure of the guides; and finally

As is more clearly illustrated in FIG. 11, each guide is constituted by two jaws 4,5. The first jaw 4, i.e. the outer one with respect to the axis of rotation of the structure 1, is fixed on a plate 6 for connection thereof to the arms 2. The inner jaw 5 is radially movable away from and towards the fixed jaw 4. The jaws 4,5 have semicylindrical grooves 7,8 at their opposite faces. In the adjacent position of the jaws, the grooves 7,8 define a bar guiding channel. The jaws 4,5 are constituted by antifriction material fixed to stiffening elements 9,10 having a substantially L-shaped cross section.

In order to control the radial movement of the jaw 5 away from or towards the jaw 4, a plurality of pivots 11 is rigidly associated with the profiled element 10. Pivots 11 engage in slots 12 provided in the plate 6 and inclined at 45 degrees with respect to the extension of the guides. A rod 13 is furthermore associated with the profiled element 9 and the stem of a fluidodynamic jack 14, having its cylinder pivoted in a bracket (now illustrated) and rigidly associated with the structure, is articulated to said rod. Naturally and other suitable actuator can be provided instead of the jack 14.

For inserting the bars in the guides 3, the structure 1 is rotated through an angle corresponding to the angular distribution of the arms 2. At each stop a guide 3 locates itself at the bar receiving position, which is arranged laterally with respect to the axis of rotation of the guides and substantially co-planar to said axis.

A means 15, for inserting the bars in the guides 3, comprises brackets 16, for temporarily supporting the bars, and pushers 17 for pushing the bars in the guide 3 which is alternatively open in reception or loading position. The means 15 are located in the reception position.

The support brackets 16 comprise horizontal arms mounted at the top of columns 16a which are rotatable about a vertical axis and actuated between two orthogonal positions in which they are perpendicular and parallel to the guides. When the brackets 16 are parallel to the guides, it is possible to raise the bars to be machined from an underlying level to a level overlying the brackets. This lifting is achieved by means of an elevator 18, visible in greater detail in FIG. 12. Said elevator comprises a plurality of levers 19 in the shape of a rocker and pivoted at a middle point 20.

Figure 12:
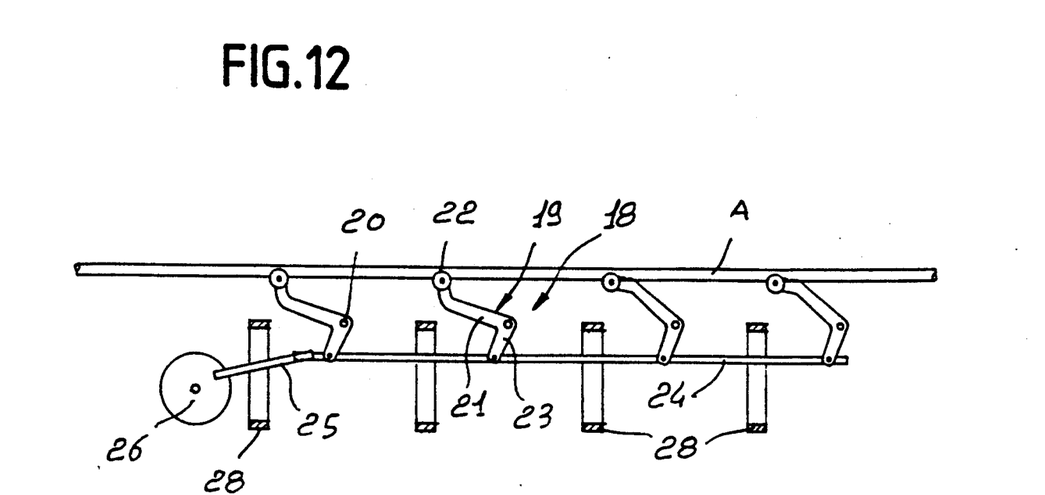
FIG. 12 is a side view of the elevators.

A first arm 21 of the levers bears a free wheel 22 having a peripheral groove with a V-shaped profile, while the ends of the second arms 23 are articulated to a rod 24 which is in turn connected to a connecting rod 25 and crank 26 assembly controlled by a actuator.

The rotation of the crank 26 imparts a to and fro motion to the rod 24 which in turn determines the oscillation of the levers 19 and the lifting and lowering of the wheels 22. These last, in low position, take up a bar A and move it to a level overlying the brackets 16 which are orientated so as to not interfere with the bar. Once this level is reached, the brackets are rotated through 90 degrees, so that when the wheels descend they can take up the bar deposited on them and ready to be transferred by the pusher 15 into the adjacent guide 3.

The elevator 18 takes up the bars at the exit from a sorter, generally indicated by the reference numeral 27 and composed of a conveyor with belts 28 would in a loop on respective driving pulleys 29 and transmission pulleys 30. The driving pulleys 29 are keyed onto a driving shaft 31 and the transmission pulleys are keyed on a driven shaft 32 so that the upper portions of the belts form a horizontal plane advancing in direction B. Above this level, at a distance corresponding to the gauge of the bars A, there is a plurality of strips 33 parallel to the belts 28 and having threaded tangs 34 which are driven through lugs 35 of the frame of the apparatus and are prevented from exiting by nuts screwed on the ends of the tangs which extend above the lugs. Springs 36 are arranged on the portions of the tangs comprised between the lugs 35 and the strips 33 and operate in compression, keeping the strips elastically stressed downwards so as to define a passage which prevents the bars from piling up onto each other and facilitates their orderly arrangement on the plane of the belts from which they are caused to advance towards an abutment 37 where they are collected by the grooved wheels 22 of the elevator 18.

The abutment 37 is adjustable according to the diameter of the bars and has a sensor which controls the elevator 18. In this manner, during lifting, the wheels of the elevator lift only one bar even if the others are closely adjacent to it.

The bars to be machined are contained in a bundle in a magazine 38 and are transferred in groups onto the sorter 27 by an elevator 39 fully similar to the previously described elevator 18.

The magazine 38 is constituted by a series of strips 40 which form a sort of bag and which are rigidly associated at one end with a supporting rod 41 mounted at the top of columns 42 which rise from the base of the loader.

The opposite end of the strips 40 is wound on respective pulleys 43 keyed on a shaft 44 which is at a certain level above the underlying belts 28 of the conveyor 27.

The shaft 44 rotates in both directions by means of a reversible electric motor or any other reversing mechanism. When the strips 40 are wound on the pulleys 43, the bottom of the bag formed thereby rises and the bars A spill over the pulleys 43 into a vertical channel 45 delimited laterally by two opposite vertical walls 46, 47, the first well being arranged tangentially with respect to the pulleys.

The bottom of the channel 45 is constituted by supports of the elevator 39 similar to the wheels 22 of the previously described elevator 18. However, as the transfer of a group of bars into the channel is intended to occur every time, these supports have a width which corresponds to the distance between the walls 46, 47 in order to support the entire group of bars and accompany it during its descent into the channel 45.

The operation of the described loader is as follows.

Figure 2:
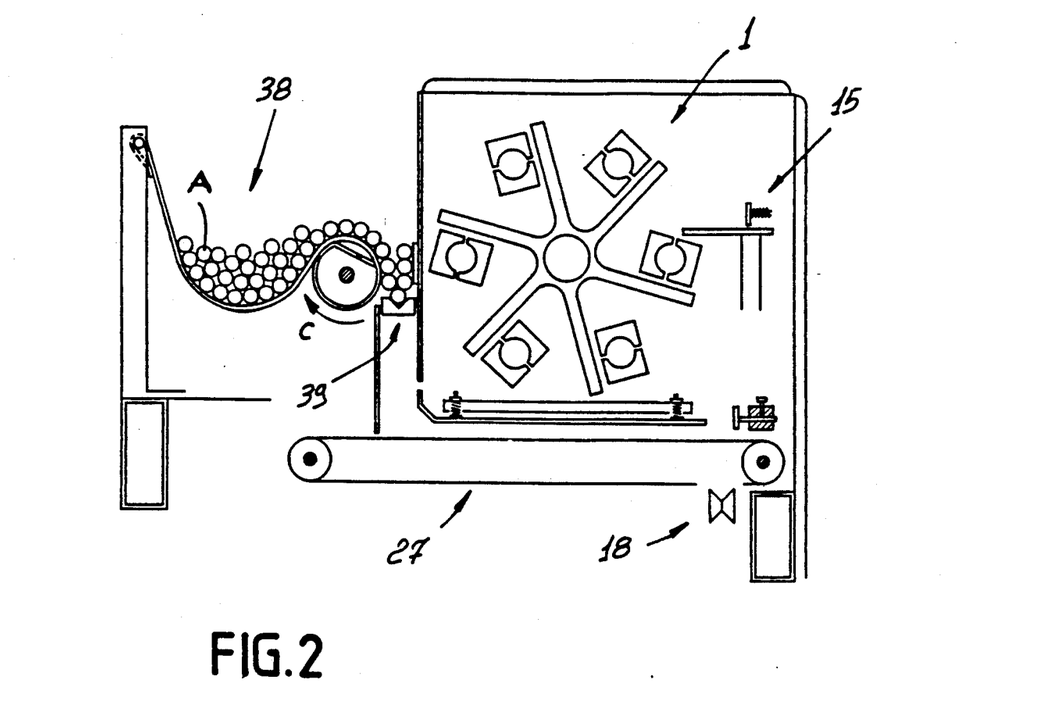

After loading the magazine 38 with bars A (FIG. 1), and after moving the supports of the elevator 39 to the required level (FIG. 2), the shaft 44 is actuated in direction C, causing, as mentioned, the overflow of the bars A into the channel 45 where they are supported by the supports of the elevator. The level reached by the bars in the channel 45 and therefore their number is detected by a sensor 48 which determines the reversal of the motion of the pulleys 43 in direction D and the descent of the supports of the elevator 39. In this manner the bars which were balanced on the pulleys fall back into the bag formed by the strips 40, while the supports of the elevator 39, descending below the upper portions of the belts 28, deposit the group of bars on said belts.

Figure 3:
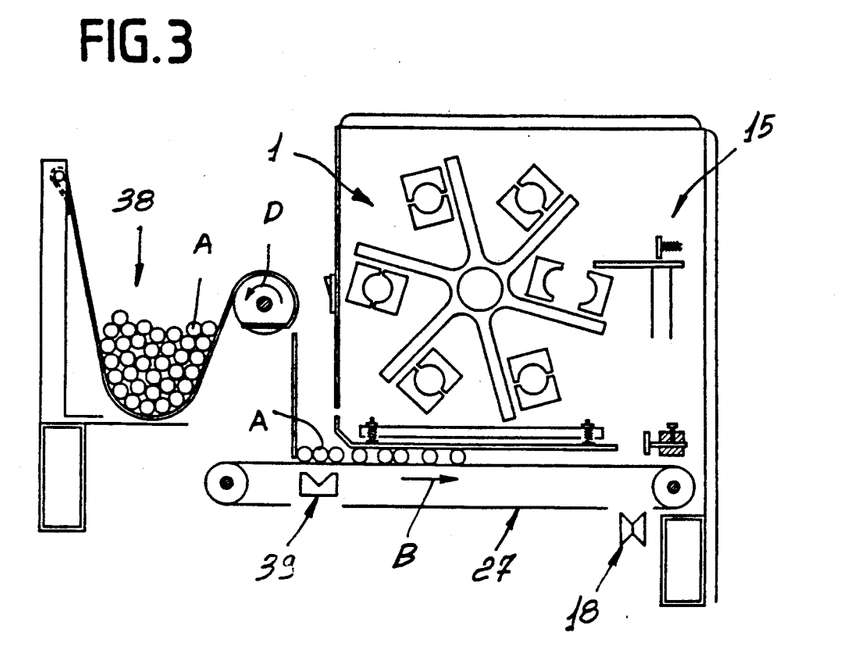

The advancement of the belts in direction B, combined with the action of the strips 33, forces the bars to assume a co-planar arrangement, preventing their stacking (FIG. 3).

Figure 4:
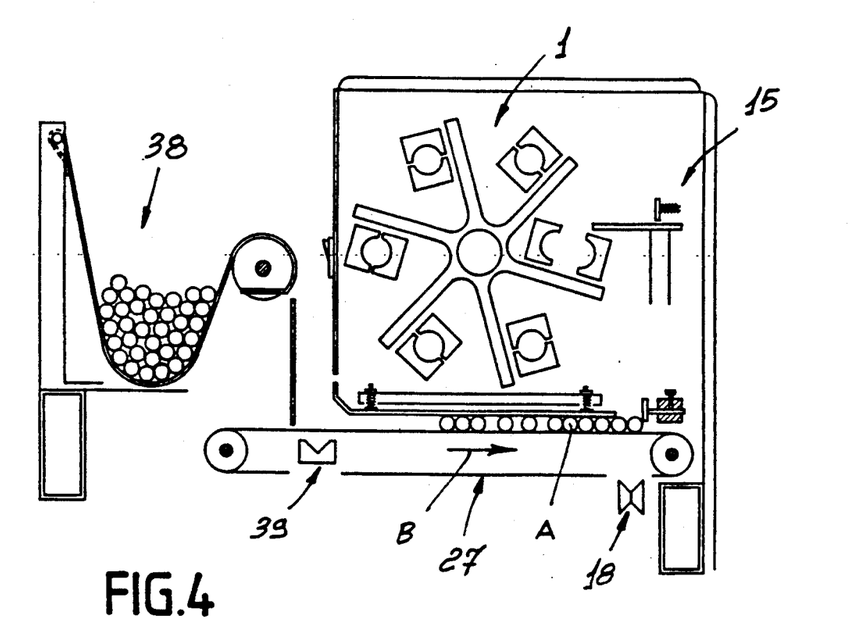
Figure 5:
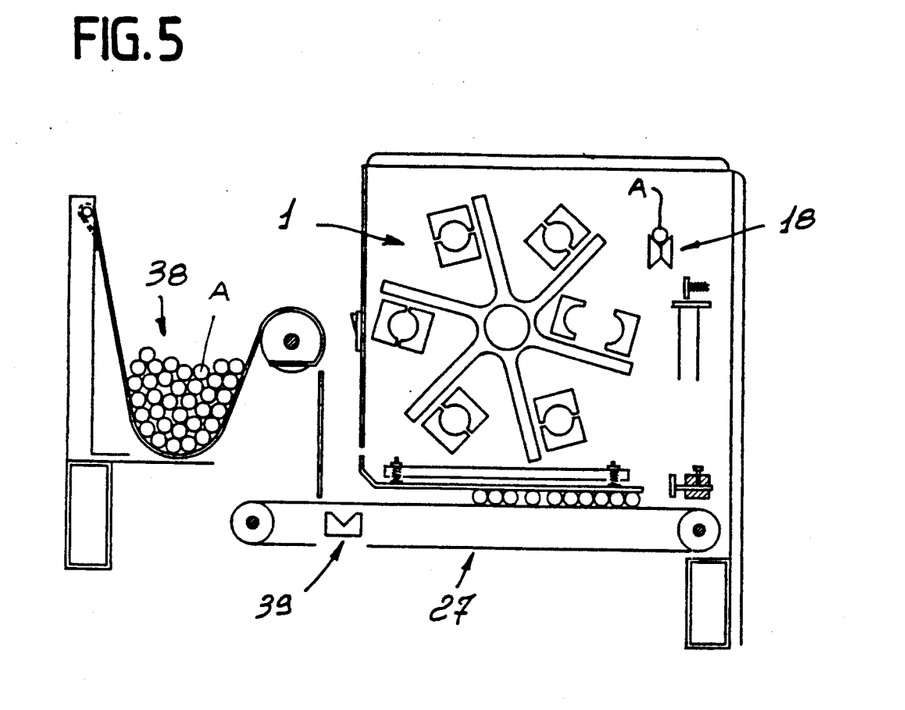
Figure 6:
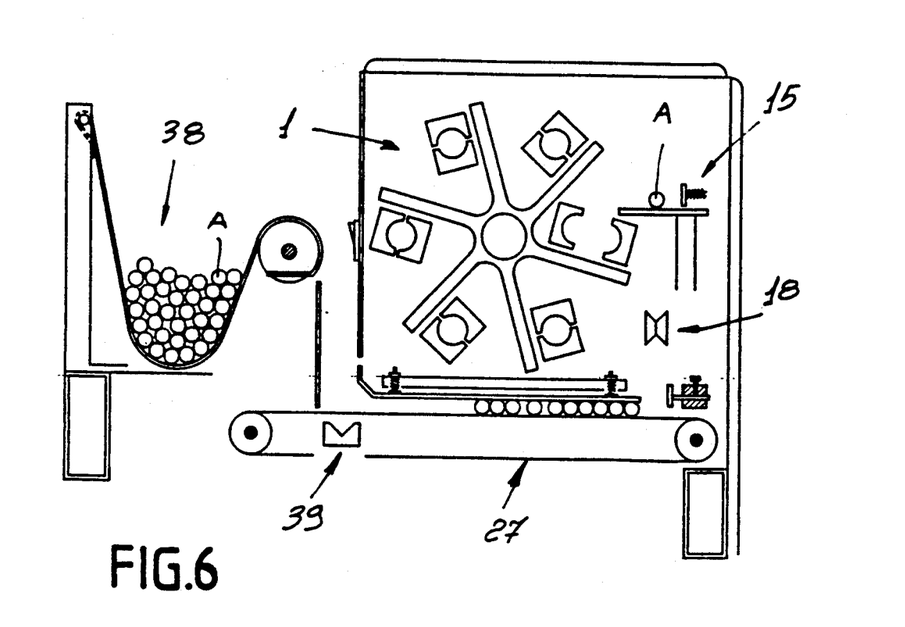
Figure 7:
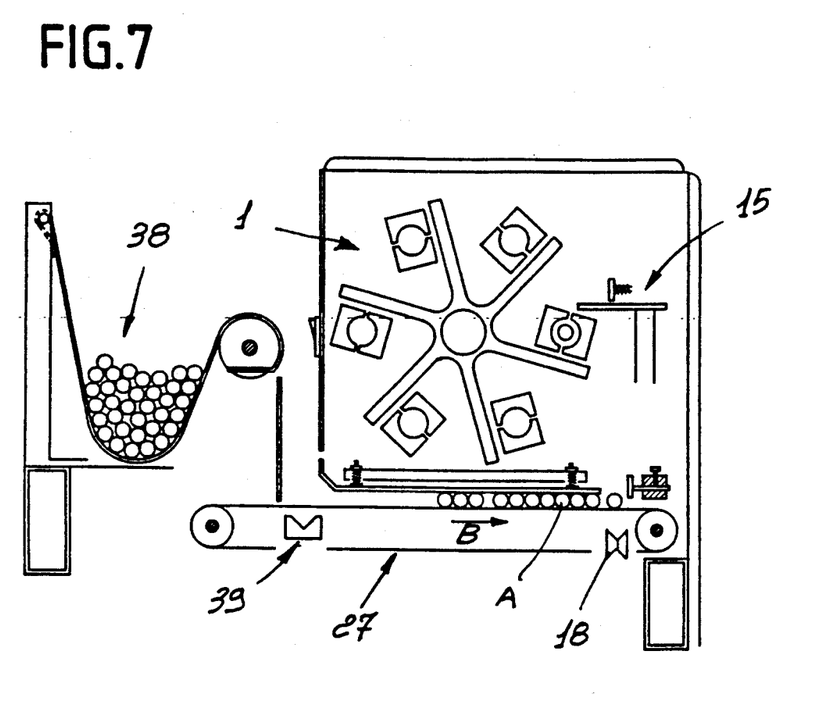

In this arrangement the bars advance in the passage defined between the strips 33 and the belts 28 until they stop against the fixed abutment 37 (FIG. 4) from where they are individually taken up by the elevator 18 and raised to the level overlying the brackets 16 (FIG. 5). Naturally during this step the brackets 16 are in a position of noninterference with the bar being lifted. After rotating the brackets into interference position, the elevator is lowered so that the bar is deposited on the brackets 16 (FIG. 6) and then transferred by the pushers 17 and the guide 3, its jaws 4,5 being open (FIG. 7).

Meanwhile the conveyor 27, which had been stopped during the lifting of the elevator 18, is actuated again to push the successive bar adjacent to the abutment 37, and the brackets 16 are rotated in non-interference position, ready for the loading of a new bar when the lathe requires it.

An important peculiarity of the loader according to the invention resides in the location of the sorter 27 below the structure 1, which allows to provide considerable construction compactness.

The described loader is susceptible to numerous modifications and variations, all within the scope of the invention.

Figure 8:
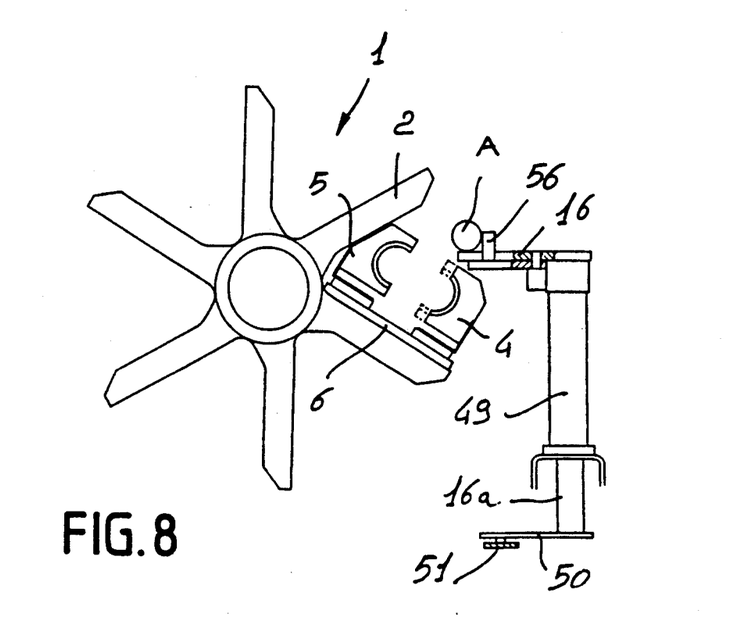
FIG. 8 is a front view of a detail of the means for inserting the bars in the guides according to another embodiment of the invention.
Figure 9:
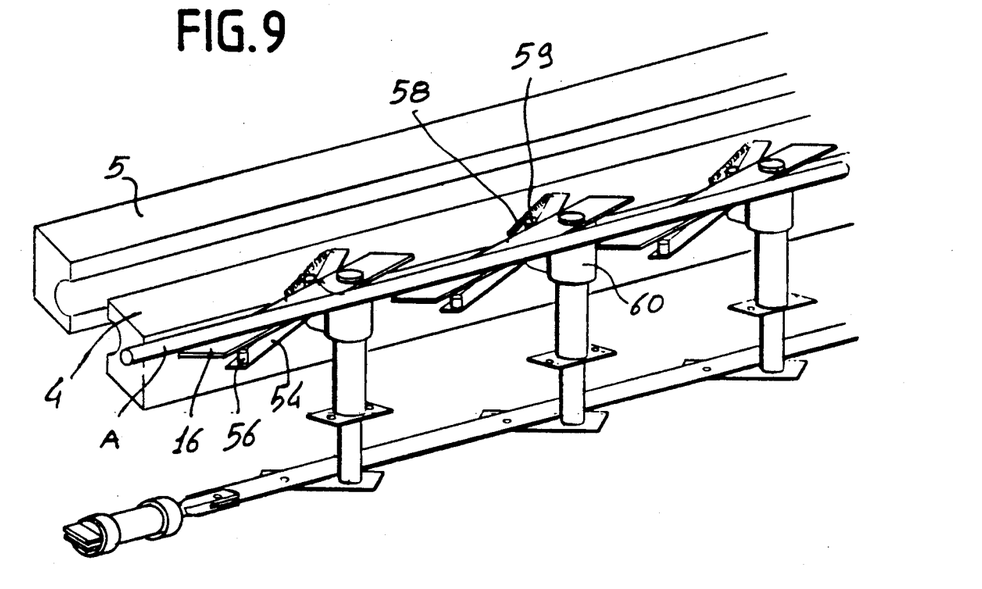
FIGS. 9-10 are perspective views of the means of FIG. 8 in two successive operating steps.
Figure 10:
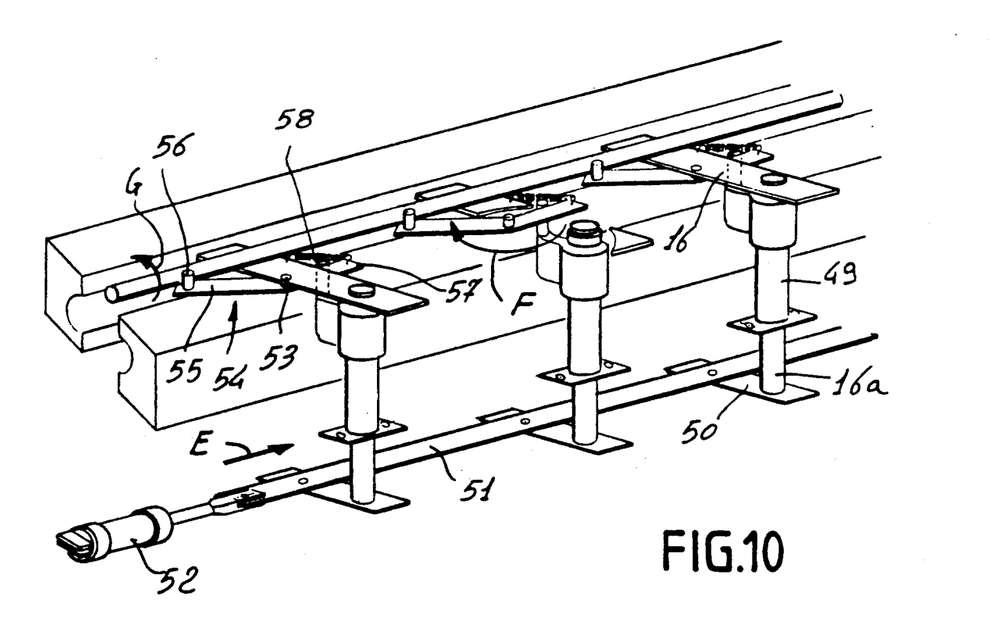

FIGS. 8-10 illustrate a variated embodiment related to the means for inserting the bars in the guides, which provides that the columns 16a, which bear the brackets 16, be rotatable in stationary sleeves 49 mounted on the frame of the loader.

The lower ends of the columns 16a have radial arms 50 articulated to one another by a connecting element 51. A fluidodynamic jack 52 linearly actuates the connecting element 51 and therefore imparts an oscillatory rotation motion to the columns 16a between the interference and noninterference positions of the bars which are lifted by the elevator. As can be seen from FIG. 9, for this particular embodiment of the insertion means, the columns 16a are positioned between the bar guide and the position where the bar A is deposited on the brackets 16 (i.e. the position of the elevator 18).

Levers with two arms 54 oscillating in a plane underlying the brackets are articulated in the brackets 16 by means of pivots 53. An upwardly protruding tooth 56 is rigidly associated with an arm 55 of the levers 54, while the end of a spring 58, the opposite end whereof is fixed to the bracket, is connected to the opposite arm 57. The spring 58 keeps the arm 57 against a finger 59 which protrudes upwards from a stationary collar 60 fixed on the stationary sleeve 49. The distance of the finger 59 from the axis of rotation of the respective column 16a is smaller than that of the fulcrum 53 of the lever 54 from said column.

FIG. 9 illustrates the condition of the means for inserting the bars in the guides when the brackets are in the position for receiving the bar A deposited thereon by the elevator 18. By activating the jack 52 in direction E, shown in FIG. 10 the brackets 16, by rotating in direction F, transfer the bar above the waiting guide 3 in open condition. During this rotation the bar remains closely adjacent to the teeth 56, while the arms 55 are slightly spaced with respect to the brackets except for the last portion at which, as an effect of the abutment with the fingers 59 on the arms 57, the arms 55 return closely adjacent to the brackets 16, pushing the bar outwards in direction G beyond the end of said brackets.

I claim:

1. In combination, a bar loader and a multi-chuck machine, said multi-chuck machine having a number of chucks, said bar loader comprising: a star-shaped structure defining a vertical plane; a number of guides for bars, said guides being supported by said star-shaped structure, said number of guides being equal to said number of chucks of said multi-chuck machine, said guides being openable to receive bars to be machined at a loading position, said loading position being arranged laterally to said star-shaped structure; a bundle magazine having an exit, said bundle magazine being arranged laterally to said star-shaped structure opposite to said loading position and being capable of feeding a preset number of bars; a bar sorter including a horizontal conveyor, said horizontal conveyor extending below said star-shaped structure, parallel to said vertical plane defined by said star-shaped structure, and a plurality of sprung strips, said sprung strips being arranged above said conveyor and defining therewith a passage for bars; a first elevator for lowering said bars from said exit of said bundle magazine onto said horizontal conveyor; a second elevator for lifting individual bars from said horizontal conveyor to said loading position, said first elevator and said second elevator being oscillatable vertically; means for inserting individual bars in said guides.

2. Bar loader according to claim 1, wherein said first elevator and said second elevator each comprise a plurality of levers, a plurality of elements for supporting a bar, and a rod, and wherein said levers oscillate in a vertical plane, each one of said levers comprise a first arm and a second arm, said first arm bearing one of said elements for supporting a bar, said second arm being articulated to said rod, said rod being actuated with reciprocating linear motion so as to vertically move simultaneously each one of said elements for supporting a bar between a position overlying said horizontal conveyor and a position below said horizontal conveyor.

3. Bar loader according to claim 2, wherein said first elevator moves in a channel, said channel being defined by a pair of walls and having a bottom, said bottom of said channel comprising said elements for supporting a bar.

4. Bar loader according to claim 1, wherein said bundle magazine comprises a plurality of strips, a fixed element, a plurality of pulleys, a common actuation shaft and a reversible motor, each of said strips having a first end and a second end, said first end being coupled to said fixed element, said second end being coupled to one of said pulleys so as to form a bar containment bag, said pulleys being keyed on said common actuation shaft, said actuation shaft being actuated by said reversible motor.

5. Bar loader according to claim 1, wherein said means for inserting bars in said guides comprise a plurality of brackets and a plurality of vertical columns each having a top end, each one of said vertical columns having one of said brackets protruding at said top end, said vertical columns being actuated with oscillating rotation motion between a position of non-interference with a bar and a position of deposition of a bar on said brackets.

6. Bar loader according to claim 5, wherein said means for inserting bars in said guides further comprise a plurality of two-arm levers, a plurality of upwardly protruding teeth, a plurality of stationary fingers and a plurality of springs, each one of said two-arm levers having a first arm and a second arm, each one of said two-arm levers being downwardly articulated to one of said brackets, each one of said two-arm levers bearing on said first arm one of said upwardly protruding teeth, each one of said upwardly protruding teeth being adapted for abutment with a bar deposited on said brackets, said springs keeping said second arm in contact with one of said stationary fingers, whereby during a terminal portion of rotation of said brackets, an additional rotation of each one of said levers with respect to said brackets is determined by said stationary fingers thus causing a descent of a bar in one of said guides.

7. Bar loader comprising:
a star-shaped structure,
a plurality of guides of bars,
a bundle magazine,
a bar sorter,
a first elevator,
a second elevator,
means for inserting bars in said guides,
said star-shaped structure being rotatable about a center axis, said guides being supported by said star-shaped structure, said guides being openable to receive bars at a loading position, said bundle magazine having an exit and being capable of feeding a preset number of bars, said bar sorted having an entrance and an outlet and being capable of transporting individual bars, wherein said loading position is arranged laterally to said star-shaped structure, said bundle magazine is arranged laterally to said star-shaped structure opposite to said loading position, said bar sorter is arranged below said star-shaped structure, said first elevator lowers bars from said exit of said bundle magazine to said entrance of said bar sorter, said second elevator raises bars from said outlet of said bar sorter to said loading position said first elevator and said second elevator oscillate in a vertical plane.

8. Bar loader according to claim 7, wherein said first elevator and second elevator each comprise a plurality of levers, a plurality of elements for supporting a bar, and a rod, and wherein said levers oscillate in a vertical plane, each one of said levers comprising a first arm and a second arm, said first arm bearing one of said elements for supporting a bar, said second arm being articulated to said rod, said rod being actuated with reciprocating linear motion so as to vertically move simultaneously each one of said elements for supporting a bar between a position overlying said horizontal conveyor and a position below said horizontal conveyor.

9. Bar loader according to claim 7, wherein said first elevator moves in a channel, said channel being defined by a pairs of walls and having a bottom, said bottom of said channel comprising said elements for supporting a bar.

10. Bar loader according to claim 7 wherein said bundle magazine comprises a plurality of strips, a fixed element, a plurality of pulleys, a common actuation shaft and a reversible motor, each of said strips having a first end and a second end, said first end being coupled to said fixed element, said second end being coupled to one of said pulleys so as to form a bar containment bag, said pulleys being keyed on said common actuation shift, said actuation shaft being actuated by said reversible motor.

11. Bar loader according to claim 7, wherein said means for inserting bars in said guides comprise a plurality of brackets and a plurality of vertical columns each having a top end, each one of said vertical columns having one of said brackets protruding at said top end, said vertical columns being actuated with oscillating rotation motion between a position of non-interference with a bar and a position of deposition of a bar on said brackets.

12. Bar loader according to claim 11, wherein said means for inserting bars in said guides further comprise a plurality of two-arm levers, a plurality of upwardly protruding teeth, a plurality of stationary fingers and a plurality of springs, each one of said two-arm levers having a first arm and a second arm, each one of said two-arm levers being downwardly articulated to one of said brackets, each one of said two-arm levers bearing on said first arm one of said upwardly protruding teeth, each one of said upwardly protruding teeth being adapted for abutment with a bar deposited on said brackets, said springs keeping said second arm in contact with one of said stationary fingers, whereby during a terminal portion of rotation of said brackets, an additional rotation of each one of said levers with respect to said brackets is determined by said stationary fingers thus causing a descent of a bar in one of said guides.

13. Bar loader comprising:
 a star-shaped structure,
 a plurality of guides for bars,
 a bundle magazine,
 a bar sorter,
 a first elevator,
 a second elevator,
 means for inserting bars in said guides, said star-shaped structure being rotatable about a center axis, said guides being supported by said star-shaped structure, said guides being openable to receive bars at a loading position, said bundle magazine having an exit and being capable of feeding a preset number of bars, said bar sorted having an entrance and an outlet and being capable of transporting individual bars, wherein said loading position is arranged laterally to said star-shaped structure, said bundle magazine is arranged laterally to said star-shaped structure opposite to said loading position, said bar sorter is arranged below said star-shaped structure, said first elevator lowers bars from said exit of said bundle magazine to said entrance of said bar sorter, said second elevator raises bars from said outlet of said bar sorter to said loading position, wherein said means for inserting bars in said guides comprise a plurality of brackets and a plurality of vertical columns each having a top end, each one of said vertical columns having one of said brackets protruding at said top end, said vertical columns being actuated with oscillating rotation motion between a position of non-interference with a bar and a position of deposition of a bar on said brackets.

14. Bar loader according to claim 13, wherein said means for inserting bars in said guides further comprise a plurality of two-arm levers, a plurality of upwardly protruding teeth, a plurality of stationary fingers and a plurality of springs, each one of said two-arm levers having a first arm and a second arm, each one of said two-arm levers being downwardly articulated to one of said brackets, each one of said two-arm levers bearing on said first arm one of said upwardly protruding teeth, each one of said upwardly protruding teeth being adapted for abutment with a bar deposited on said brackets, said springs keeping said second arm in contact with one of said stationary fingers, whereby during a terminal portion of rotation of said brackets, an additional rotation of each one of said levers with respect to said brackets is determined by said stationary fingers thus causing a descent of a bar in one of said guides.

* * * * *